(12) United States Patent
Dihlmann

(10) Patent No.: US 9,851,432 B2
(45) Date of Patent: Dec. 26, 2017

(54) SENSOR HOLDER FOR A SENSOR FOR OBJECT DETECTION

(71) Applicant: ROBERT BOSCH GMBH, Stuttgart (DE)

(72) Inventor: Matthias Dihlmann, Engelsbrand (DE)

(73) Assignee: ROBERT BOSCH GMBH, Stuttgart (DE)

( * ) Notice: Subject to any disclaimer, the term of this patent is extended or adjusted under 35 U.S.C. 154(b) by 254 days.

(21) Appl. No.: 14/386,197

(22) PCT Filed: Jan. 21, 2013

(86) PCT No.: PCT/EP2013/051025
§ 371 (c)(1),
(2) Date: Sep. 18, 2014

(87) PCT Pub. No.: WO2013/139499
PCT Pub. Date: Sep. 26, 2013

(65) Prior Publication Data
US 2015/0041604 A1 Feb. 12, 2015

(30) Foreign Application Priority Data

Mar. 19, 2012 (DE) .................. 10 2012 204 267

(51) Int. Cl.
*G01S 7/40* (2006.01)
*G01S 7/02* (2006.01)
(Continued)

(52) U.S. Cl.
CPC ............ *G01S 7/4026* (2013.01); *B60R 11/00* (2013.01); *G01S 7/02* (2013.01); *G01S 7/4004* (2013.01);
(Continued)

(58) Field of Classification Search
CPC ..... G01S 2013/9375; G01S 2013/9371; G01S 2007/403; G01S 2007/4034; G01S 7/4004;
(Continued)

(56) References Cited

U.S. PATENT DOCUMENTS 3,749,197 A * 7/1973 Deutsch ............. B60K 31/0008
180/169
5,313,213 A * 5/1994 Neumann ............ B60Q 1/0023
342/165
(Continued)

FOREIGN PATENT DOCUMENTS

CN 102236095 A 11/2011
DE 101 54 080 5/2003
(Continued)

OTHER PUBLICATIONS

International Search Report for PCT/EP2013/051025, dated Mar. 27, 2013.

*Primary Examiner* — Eret McNichols
(74) *Attorney, Agent, or Firm* — Norton Rose Fulbright US LLP; Gerard Messina

(57) ABSTRACT

A sensor holder for a sensor for object detection includes: an installation unit for the sensor; a holding frame on which the installation unit is pivotably held; and an adjustment shaft mounted on the holding frame, the adjustment shaft having a guidance contour which proceeds helically around the adjustment shaft and is in engagement with a guidance element of the installation unit.

13 Claims, 3 Drawing Sheets

(51) Int. Cl.
*B60R 11/00* (2006.01)
*G01S 13/00* (2006.01)
*F16H 57/021* (2012.01)
*G01S 13/93* (2006.01)

(52) U.S. Cl.
CPC ............ *G01S 13/00* (2013.01); *G01S 13/931* (2013.01); *B60K 2350/405* (2013.01); *B60R 2011/0085* (2013.01); *F16H 57/021* (2013.01); *G01S 2007/027* (2013.01); *G01S 2007/403* (2013.01); *G01S 2007/4034* (2013.01); *G01S 2013/9321* (2013.01); *G01S 2013/9371* (2013.01); *G01S 2013/9375* (2013.01)

(58) Field of Classification Search
CPC .......... G01S 7/4026; G01S 7/02; G01S 13/00; G01S 2007/027; B60K 2350/405; F16H 7/021; F16H 57/021; B60R 11/00
See application file for complete search history.

(56) References Cited

U.S. PATENT DOCUMENTS

| | | | | |
|---|---|---|---|---|
| 6,026,353 | A * | 2/2000 | Winner | G01S 7/4026 342/70 |
| 6,601,466 | B2 * | 8/2003 | Koerber | G01S 7/4026 74/417 |
| 6,636,473 | B1 * | 10/2003 | Kagaya | G11B 7/08582 720/683 |
| 6,714,156 | B1 | 3/2004 | Ibrahim et al. | |
| 6,828,931 | B2 | 12/2004 | Kikuchi et al. | |
| 6,842,152 | B2 * | 1/2005 | Kikuchi | G01S 7/4026 342/70 |
| 6,880,256 | B2 * | 4/2005 | Helms | G01S 7/4026 33/227 |
| 6,892,413 | B2 * | 5/2005 | Blaustein | A46B 9/025 15/22.1 |
| 6,922,211 | B2 * | 7/2005 | Sturiale | G08B 13/19619 348/373 |
| 6,954,174 | B2 * | 10/2005 | Isaji | G01S 7/4026 180/167 |
| 7,132,976 | B2 * | 11/2006 | Shinoda | G01S 7/2925 342/118 |
| 7,243,885 | B2 | 7/2007 | Zeiher et al. | |
| 7,346,994 | B2 * | 3/2008 | Shevela | G01S 7/4026 33/288 |
| 7,669,339 | B1 * | 3/2010 | Arnal | H01Q 1/1207 33/263 |
| 7,675,460 | B2 * | 3/2010 | Sanada | G01S 7/4026 180/167 |
| 7,886,803 | B2 * | 2/2011 | Anderson | E06B 9/262 160/170 |
| 7,973,529 | B2 * | 7/2011 | Kikuchi | H02K 23/66 324/173 |
| 8,230,896 | B2 * | 7/2012 | Anderson | E06B 9/262 160/170 |
| 8,459,328 | B2 * | 6/2013 | Anderson | E06B 9/262 160/171 |
| 8,997,827 | B2 * | 4/2015 | Anderson | 160/170 |
| 9,310,467 | B2 * | 4/2016 | Zeller | G01S 7/4026 |
| 9,352,651 | B2 * | 5/2016 | Formey | B60K 31/0008 |
| 2003/0184471 | A1 * | 10/2003 | Tohyama | G01S 7/4026 342/175 |
| 2004/0003951 | A1 | 1/2004 | Kikuchi et al. | |
| 2004/0239574 | A1 | 12/2004 | Zeiher et al. | |
| 2014/0352462 | A1 * | 12/2014 | Wood | F03G 3/08 74/5.7 |
| 2015/0241554 | A1 * | 8/2015 | Yu | G01S 13/931 342/75 |
| 2016/0173665 | A1 * | 6/2016 | Hantsch | F16H 57/021 455/575.1 |

FOREIGN PATENT DOCUMENTS

| | | |
|---|---|---|
| DE | 103 07 263 | 10/2003 |
| DE | 103 54 985 | 6/2004 |

* cited by examiner

SENSOR HOLDER FOR A SENSOR FOR OBJECT DETECTION

BACKGROUND OF THE INVENTION

1. Field of the Invention

The present invention relates to a sensor holder for object detection, e.g., for a radar sensor in motor vehicles.

2. Description of the Related Art

Radar sensors are used in motor vehicles in order to measure the distance and/or speed of objects. Driver assistance systems are known, for example, in the form of vehicle speed regulators for motor vehicles having a radar system for localizing a preceding vehicle and for measuring the distance to it. A distance control system of this kind is also referred to as an adaptive cruise control (ACC) system.

In order to ensure the correct functioning of radar sensors, they must be aligned, for example after installation in the vehicle, within predefined limits with respect to the road surface and to the desired sensing region. For a radar sensor for an adaptive vehicle speed regulation system, for example, alignment of a principal radiating direction of the radar sensor within an accurately defined angle with respect to the longitudinal vehicle axis is necessary, for example parallel to the longitudinal vehicle axis. An alignment of this kind allows compensation, for example, for manufacturing-related tolerances of the mechanical components of the radar sensor, and for tolerances upon fastening on the motor vehicle.

For a radar sensor for object detection, alignment or adjustment of an inclination angle of a principal radiating direction of the radar sensor is particularly important. This angle is also referred to as the "elevation."

Published German patent application document DE 101 54 080 A1 discloses a holder for an adjustable housing of a radar sensor, in which holder the position of the housing at an installation location is modifiable in a horizontal and a vertical position using adjustment screws. In particular, the inclination angle of the radar sensor can be modified. The adjustment screws are held at the installation location rotatably and tiltably in respective fastening domes. The respective fastening domes can in turn be latched in nonrotatably and in pullout-proof fashion in a corresponding recess at the installation location.

BRIEF SUMMARY OF THE INVENTION

An object of the invention is to create a sensor holder that, with a particularly simple construction, enables vertical adjustment of a sensor.

This object is achieved by a sensor holder for a sensor for object detection having an installation unit for the sensor and having a holding frame on which the installation unit is pivotably held, and having an adjustment shaft, mounted on the holding frame, that has a guidance contour that proceeds helically around the adjustment shaft and is in engagement with a guidance element of the installation unit. The guidance contour proceeds helically, i.e. along a helical line, around the circumference of the adjustment shaft.

The sensor holder requires only a few movable components. Pivotable mounting of the installation unit on the holding frame can be accomplished simply, for example, using two shaped-on pegs. A rotatably mounted adjustment shaft can allow, by way of the guidance contour proceeding helically around the adjustment shaft, accurate and self-limiting adjustment of the position of the guidance element in engagement with the guidance contour. Compensation between the adjustment direction (predefined by the guidance contour) parallel to the longitudinal axis of the adjustment shaft and a circular-arc-shaped pivoting motion of the guidance element around the pivot axis on the holding frame, can be enabled by the radial clearance of the engagement.

The installation unit is preferably held pivotably on the holding frame via pegs that are disposed on a pivot axis. The pegs can be constituted, for example, on the installation unit or on the holding frame. They enable particularly simple pivotable mounting of the installation unit on the holding frame.

The holding frame preferably has at least one snap-in receptacle, embodied as a rotary bearing, for a portion of the adjustment shaft, the snap-in receptacle being open on one circumferential portion. This allows the portion of the adjustment shaft to be introduced into the snap-in receptacle through the open portion of the circumference. In particular, the adjustment shaft can preferably be snapped into the snap-in receptacle. The snap-in receptacle is preferably open on a circumferential portion located oppositely to the installation unit. The adjustment shaft can be insertable, for example, from one position into the snap-in receptacle accompanied by snap-locking, in which the position the installation unit is then disposed. For example, the adjustment shaft can be disposed between the installation unit and a bottom of the snap-in receptacle. Any transverse forces occurring, upon alignment, between the adjustment shaft and the guidance element of the installation unit can thereby ben received by the holding frame, by the fact that the adjustment shaft braces against the bottom of the snap-in receptacle.

Preferably at least one portion of the adjustment shaft mounted in the at least one snap-in receptacle is embodied integrally with the guidance contour, and the at least one snap-in receptacle is embodied integrally with a portion of the holding frame. For example, the adjustment shaft can be embodied as an integral plastic part. For example, the holding frame can be embodied with the at least one snap-in receptacle as an integral plastic part. Assembly of the holding frame to the adjustment shaft is thereby particularly simplified.

DETAILED DESCRIPTION OF THE INVENTION

Figure 1:
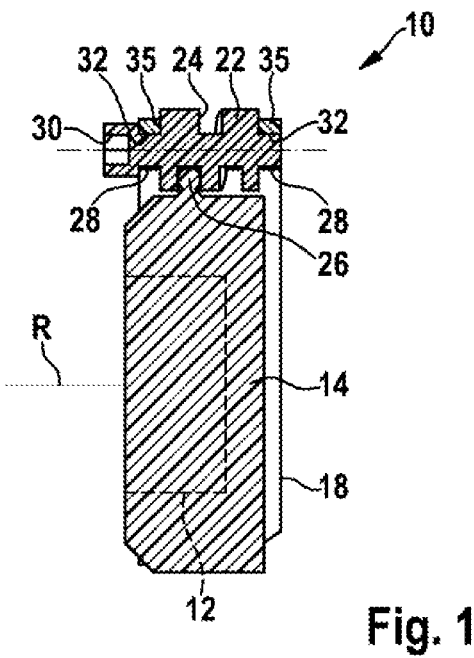
FIG. 1 schematically depicts a sensor holder along a vertical section plane.
Figure 2:
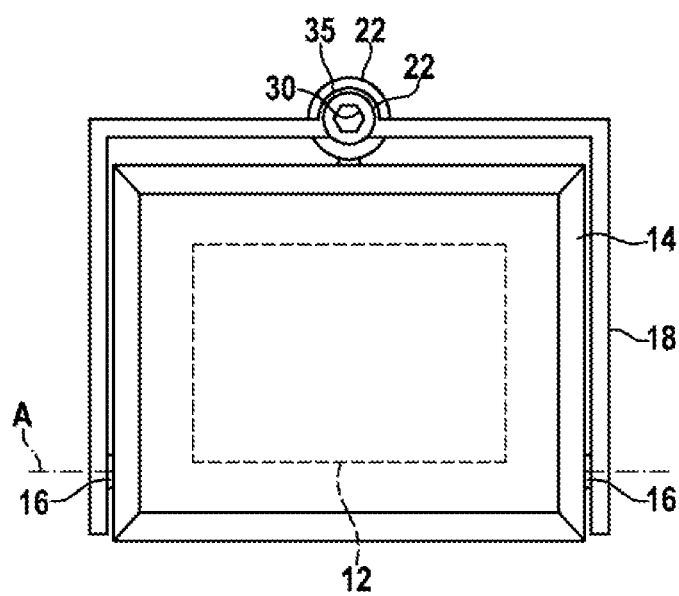
FIG. 2 is a front view of the sensor holder.
Figure 3:
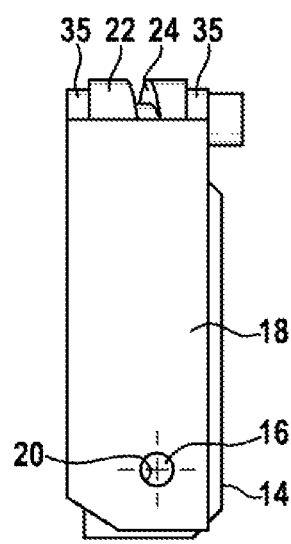
FIG. 3 is a side view of the sensor holder.

FIGS. 1 to 3 show a sensor unit having a sensor holder 10 and a radar sensor 12 that has an installation unit 14 in the form of a housing. Radar sensor 12 is a radar sensor for a driver assistance system of a motor vehicle, in particular for a vehicle speed controller.

Installation unit 14 is mounted pivotably on a holding frame 18 of the sensor holder by way of shaped-on cylindrical pegs 16. Holding frame 18 has at least two lateral limbs and a base connecting them, which base extends in a U-shape around installation unit 14. Pegs 16 engage into hollow-cylindrical recesses 20 on the lateral limbs of holding frame 18. In the sectioned depiction in FIG. 1, principal radiating direction R of radar sensor 12 extends to the left in the drawing plane. Installation unit 14 is pivotable by way of pegs 16 around a transversely extending horizontal axis A. At the installation location in a motor vehicle, sensor holder 10 is installed on the motor vehicle by the fact that holding frame 18 is fastened to the motor vehicle.

A pivoting of radar sensor 12, disposed on installation unit 14, around pivot axis A causes the inclination angle of principal radiating direction R of radar sensor 12 with respect to the horizontal to change. In order to adjust this angular orientation, an adjustment shaft 22 is mounted on holding frame 18 at a distance from pivot axis A.

The adjustment shaft has, on a central cylindrical portion, a guidance contour 24 in the form of a helical peripheral groove extending helically around the adjustment shaft. Disposed in this guidance contour 24 is a guidance element 26 in the form of a ball head, which is disposed on installation unit 14 at a distance from pivot axis A. The width of the groove is adapted to the width of the ball head, i.e. to its diameter, so that the ball head is positioned with zero clearance in the guidance contour in the axial direction of adjustment shaft 22. The depth of the groove of guidance contour 24 corresponds, for example, at least to the diameter of the ball head. Secure guidance can thereby be enabled.

Pegs 16 and guidance element 26 are shaped onto installation unit 14, for example, in the form of molded plastic parts.

In the example shown, adjustment shaft 22 and guidance element 26 are disposed in the region of a center portion of the base of holding frame 18. Alternatively, however, they can also be disposed, for example, at a distance from pivot axis A in the region of a lateral limb of holding frame 18.

Adjustment shaft 22 has two bearing portions 28 between which the aforementioned center portion is disposed. Adjustment shaft 22 furthermore has, at least at one end, an engagement contour 30 for torque transfer to the adjustment shaft. Engagement contour 30 can be embodied, for example, in the form of a hex socket receptacle for a socket wrench.

Adjustment shaft 22 is manufactured, for example, as an integral molded plastic part.

Figure 5:
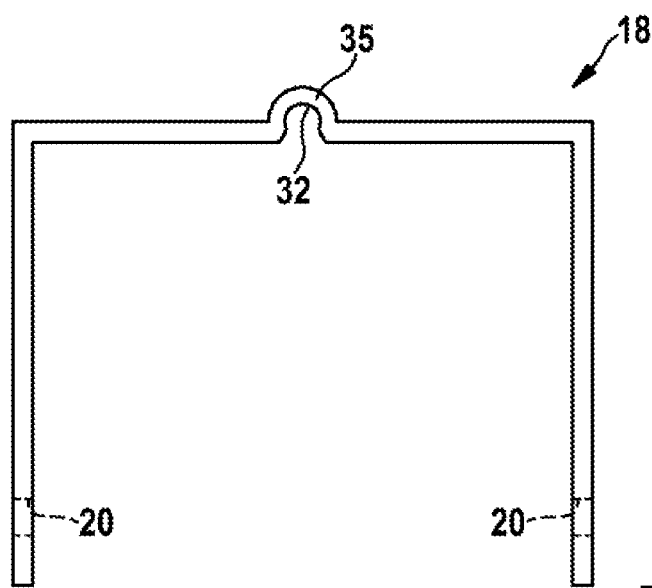
FIG. 5 is a front view of the holding frame.

Holding frame 18 is manufactured, for example, integrally of plastic, and forms at its base two coaxially disposed snap-in receptacles 32 embodied as rotary bearings, which are visible in cross section in FIG. 5. Snap-in receptacles 32 are each open on a circumferential portion, specifically on the side facing toward installation unit 14. Snap-in receptacles 32 have a hollow-cylindrical shape that is interrupted by the open circumferential portion. They respectively wrap around bearing portions 28 of adjustment shaft 22 over a circumferential angle range of more than 180°, so that bearing portions 28 adapted to the inside diameter of snap-in receptacle 32 are held in snap-locked fashion in snap-in receptacles 32. Adjustment shaft 22 is thereby mounted rotatably in snap-in receptacles 32.

Figure 4:
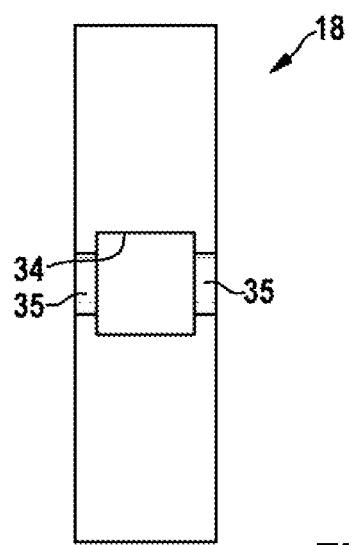
FIG. 4 is a plan view of a holding frame of the sensor holder.

In the example shown, the center portion of adjustment shaft 22, on which portion guidance contour 24 is embodied, has a larger outside diameter than bearing portions 28. The displacement travel for adjustment is thereby increased. A cutout 34 for the center portion of adjustment shaft 22 is thus formed in holding frame 18 in the region between snap-in receptacles 32. FIG. 4 shows cutout 34 in a plan view of holding frame 18. Snap-in receptacles 32 are embodied, for example, on flanges 35 of the base of holding frame 18, which flanges 35 demarcate cutout 34 on opposite sides. Flanges 35, for example, connect two sub-sections of holding frame 18.

The axial position of adjustment shaft 22 is defined with respect to holding frame 18 by at least one circumferential projection of adjustment shaft 22. In the example shown, two circumferential projections, with which the axial position of adjustment shaft 22 between snap-in receptacles 32 is defined, are formed at the transitions from bearing portions 28 to the center portion of adjustment shaft 22, which portion has a larger outside diameter than bearing portions 28. This is evident in FIG. 1 and FIG. 3.

In order to assemble the sensor holder, adjustment shaft 22 can simply be snapped into snap-in receptacles 32 from the open side thereof. Guidance element 26 can then be introduced into guidance contour 24, and installation unit 14 with radar sensor 12 can be installed by introducing pegs 16 into recesses 20 on holding frame 18.

FIG. 3 is a view from the side of the assembled sensor holder.

Adjustment shaft 22 is mounted rotatably on holding frame 18, and retained in an axial direction. The axial position of alignment element 26 with reference to adjustment shaft 22 can be set by rotating adjustment shaft 22, for example using a socket wrench. Installation unit 14, and thus radar sensor 12, is pivotable, by way of a rotation of adjustment shaft 22, around pivot axis A passing through the lateral bearing points of pegs 16. Because guidance contour 24 extends around the circumference of adjustment shaft 22 along a helical line whose angle of inclination is preferably less than 45°, self-limiting of the guidance system is enabled in simple fashion.

The configuration described allows the number of components required to be reduced to a minimum. Alignment of the adjustment shaft transversely to pivot axis A and approximately parallel to principal radiating direction R permits subsequent adjustment of the inclination angle of radar sensor 12, i.e. after the installation of radar sensor 12 on the motor vehicle. In particular, in the case of a principal radiating direction R directed forward, engagement contour 30 for torque transfer can also be directed forward so that it is easily accessible. A further advantage is that the adjustment device constituted by adjustment shaft 22 and guidance element 26 requires little installation space. Adjustment shaft 22 is moreover disposed between snap-in receptacles 32 and installation unit 14, so that it can continue to take on the function of securely holding radar sensor 12 even in the event of detachment from one snap-in receptacle 32. The fact that only one spatial coordinate of the position of guidance element 26 is defined upon engagement of guidance element 26 into guidance contour 24, namely the position of adjustment shaft 22 in an axial direction, makes possible a particularly simple configuration of the pivot mount of installation unit 14 on holding frame 18 by way of pegs 16.

That portion of the adjustment shaft which has the guidance contour is preferably round and can be cylindrical; or, in a departure from the example described, it can have a varying outside radius, for example can be frustoconical.

What is claimed is:

1. A sensor holder for a sensor for object detection, comprising:
    an installation unit for the sensor;
    a holding frame on which the installation unit is pivotably held; and
    an adjustment shaft mounted on the holding frame, the adjustment shaft being aligned transversely to a pivot axis of the of the installation unit and parallel to a principal radiating direction of the sensor, the adjustment shaft having a guidance contour which proceeds helically around the adjustment shaft and is in engagement with a guidance element of the installation unit, wherein the installation unit is held on the holding frame via pegs disposed on and aligned parallel to the pivot axis of the installation unit.

2. The sensor holder as recited in claim 1, wherein the holding frame has two coaxially disposed snap-in receptacles configured as rotary bearings that each have a hollow, cylindrical shape, are open on circumferential portions thereof, and respectively wrap around bearing portions of the adjustment shaft over a circumferential angle range of more than 180°, so that the bearing portions adapted to an inside diameter of the snap-in receptacles are held in snap-locked fashion in the snap-in receptacles.

3. The sensor holder as recited in claim 2, wherein the circumferential portions face toward the installation unit.

4. The sensor holder as recited in claim 2, wherein an axial position of the adjustment shaft is defined by at least one circumferential projection of the adjustment shaft with respect to the holding frame.

5. The sensor holder as recited in claim 4, wherein the adjustment shaft is configured as an integral plastic part.

6. The sensor holder as recited in claim 1, wherein at least two of the pegs are shaped onto the installation unit.

7. A sensor holder for a sensor for object detection, comprising:
an installation unit for the sensor;
a holding frame on which the installation unit is pivotably held; and
an adjustment shaft mounted on the holding frame, the adjustment shaft being aligned transversely to a pivot axis of the of the installation unit and parallel to a principal radiating direction of the sensor, the adjustment shaft having a guidance contour which proceeds helically around the adjustment shaft and is in engagement with a guidance element of the installation unit,
wherein the holding frame has two coaxially disposed snap-in receptacles configured as rotary bearings that each have a hollow, cylindrical shape, are open on circumferential portions thereof, and respectively wrap around bearing portions of the adjustment shaft over a circumferential angle range of more than 180°, so that the bearing portions adapted to an inside diameter of the snap-in receptacles are held in snap-locked fashion in the snap-in receptacles, and
wherein a center portion of the adjustment shaft encompasses the guidance contour, and said center portion is disposed between the bearing portions.

8. A sensor holder for a sensor for object detection, comprising:
an installation unit for the sensor;
a holding frame on which the installation unit is pivotably held; and
an adjustment shaft mounted on the holding frame, the adjustment shaft having a guidance contour which proceeds helically around the adjustment shaft and is in engagement with a guidance element of the installation unit,
wherein the holding frame has two coaxially disposed snap-in receptacles configured as rotary bearings that each have a hollow, cylindrical shape, are open on circumferential portions thereof, and respectively wrap around bearing portions of the adjustment shaft over a circumferential angle range of more than 180°, so that the bearing portions adapted to an inside diameter of the snap-in receptacles are held in snap-locked fashion in the snap-in receptacles.

9. The sensor holder as recited in claim 8, wherein the installation unit is held on the holding frame via pegs disposed on a pivot axis of the installation unit.

10. The sensor holder as recited in claim 8, wherein the circumferential portions face toward the installation unit.

11. The sensor holder as recited in claim 8, wherein an axial position of the adjustment shaft is defined by at least one circumferential projection of the adjustment shaft with respect to the holding frame.

12. The sensor holder as recited in claim 11, wherein the adjustment shaft is configured as an integral plastic part.

13. A sensor holder for a sensor for object detection, comprising:
an installation unit for the sensor;
a holding frame on which the installation unit is pivotably held; and
an adjustment shaft mounted on the holding frame, the adjustment shaft having a guidance contour which proceeds helically around the adjustment shaft and is in engagement with a guidance element of the installation unit,
wherein the holding frame has two coaxially disposed snap-in receptacles configured as rotary bearings that each have a hollow, cylindrical shape, are open on circumferential portions thereof, and respectively wrap around bearing portions of the adjustment shaft over a circumferential angle range of more than 180°, so that the bearing portions adapted to an inside diameter of the snap-in receptacles are held in snap-locked fashion in the snap-in receptacles,
wherein a center portion of the adjustment shaft encompasses the guidance contour, and said center portion is disposed between the bearing portions.

* * * * *